US009998318B2

(12) United States Patent
Sagong et al.

(10) Patent No.: US 9,998,318 B2
(45) Date of Patent: Jun. 12, 2018

(54) TRANSMIT DIVERSITY METHOD FOR FQAM AND APPARATUS THEREOF

(71) Applicant: Samsung Electronics Co., Ltd., Suwon-si, Gyeonggi-do (KR)

(72) Inventors: Min Sagong, Suwon-si (KR); Keonkook Lee, Suwon-si (KR); Sungnam Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/123,850

(22) PCT Filed: Mar. 5, 2015

(86) PCT No.: PCT/KR2015/002132
§ 371 (c)(1),
(2) Date: Sep. 6, 2016

(87) PCT Pub. No.: WO2015/133836
PCT Pub. Date: Sep. 11, 2015

(65) Prior Publication Data
US 2017/0019288 A1 Jan. 19, 2017

(30) Foreign Application Priority Data
Mar. 5, 2014 (KR) ........................ 10-2014-0025840

(51) Int. Cl.
*H04L 27/34* (2006.01)
*H04B 7/06* (2006.01)
(Continued)

(52) U.S. Cl.
CPC ............. *H04L 27/34* (2013.01); *H04B 7/068* (2013.01); *H04B 7/0669* (2013.01); *H04B 7/12* (2013.01);
(Continued)

(58) Field of Classification Search
CPC ....... H04L 27/34; H04B 7/0669; H04B 7/068; H04B 7/12
See application file for complete search history.

(56) References Cited

U.S. PATENT DOCUMENTS

2004/0131125 A1* 7/2004 Sanderford, Jr. ......... H04L 5/06
375/261
2008/0253478 A1 10/2008 Kim et al.
(Continued)

FOREIGN PATENT DOCUMENTS

EP 2387173 A2 11/2011
KR 10-2014-0096559 A 8/2014
(Continued)

OTHER PUBLICATIONS

Fadel F. Digham and Mohamed Slim Alouini; Adaptive Hybrid M-FSK M-QAM Modulation; Department of Electrical and Computer Engineering; University of Minnesota; Aug. 2003.*
(Continued)

*Primary Examiner* — Dac Ha
(74) *Attorney, Agent, or Firm* — Jefferson IP Law, LLP (57) ABSTRACT

The present invention relates to a transmit diversity method for FQAM and an apparatus therefor. According to the present invention, a transmit diversity method for FQAM and apparatus therefor are provided, the transmit diversity method comprising the steps of: modulating data into at least one FQAM symbol; interleaving a plurality of tones constituting the at least one FQAM symbol such that tones having the same index are located in adjacent resources; and transmitting the at least one interleaved FQAM symbol through at least one transceving unit.

8 Claims, 11 Drawing Sheets

(51) Int. Cl.
*H04B 7/12* (2006.01)
*H04L 27/10* (2006.01)
*H04L 1/00* (2006.01)
*H04L 1/06* (2006.01)
*H04L 5/00* (2006.01)

(52) U.S. Cl.
CPC .......... *H04L 1/0071* (2013.01); *H04L 1/0606* (2013.01); *H04L 1/0643* (2013.01); *H04L 1/0668* (2013.01); *H04L 27/106* (2013.01); *H04L 5/0023* (2013.01)

(56) References Cited

U.S. PATENT DOCUMENTS

| | | |
|---|---|---|
| 2009/0202016 A1 | 8/2009 | Seong et al. |
| 2009/0252248 A1 | 10/2009 | Ghosh et al. |
| 2009/0262855 A1 | 10/2009 | Lee et al. |
| 2014/0211880 A1 | 7/2014 | Sagong et al. |
| 2014/0211887 A1 | 7/2014 | Sagong et al. |
| 2014/0269992 A1 | 9/2014 | Hong et al. |
| 2015/0188573 A1 | 7/2015 | Lorca |
| 2017/0177756 A1* | 6/2017 | Martin .................. G06F 17/16 |
| 2017/0214502 A1* | 7/2017 | Kim .................. H04B 7/0617 |

FOREIGN PATENT DOCUMENTS

| | | |
|---|---|---|
| KR | 10-2014-0096560 A | 8/2014 |
| KR | 10-2014-0111890 A | 9/2014 |
| WO | 2014/012925 A1 | 1/2014 |

OTHER PUBLICATIONS

Sungnam Hong et af, FQAM : A modulation scheme for beyond 4G cellular wireless communication systems, 2013 IEEE Globecom Workshops (GC Wkshps), Dec. 9-13, 2013, pp. 25-30, Atlanta, GA.

H0ng Sungnam et al: FQAM : A modulation scheme for beyond 4G cellular wireless communication systems, 2013 IEEE Gl0becom Workshops (GC Wkshps), IEEE, Dec. 9, 2013 (Dec. 9, 2013), pp. 25-30, XP032599889, DOI: 10.1109/GL0COMW.2013.6824956 [retrieved on Jun. 3, 2014]; Suwon-si, KR.

* cited by examiner

$$\begin{bmatrix} x_1 & 0 & x_2 & 0 \\ 0 & x_3 & 0 & x_4 \\ -x_2^* & 0 & x_1^* & 0 \\ 0 & -x_4^* & 0 & x_3^* \end{bmatrix} = \begin{bmatrix} x_{11} & x_{12} & x_{13} & x_{14} & x_{21} & x_{22} & x_{23} & x_{24} & 0 & 0 & 0 & 0 & 0 & 0 & 0 & 0 \\ 0 & 0 & 0 & 0 & 0 & 0 & 0 & 0 & x_{31} & x_{32} & x_{33} & x_{34} & x_{41} & x_{42} & x_{43} & x_{44} \\ -x_{21}^* & -x_{22}^* & -x_{23}^* & -x_{24}^* & x_{11}^* & x_{12}^* & x_{13}^* & x_{14}^* & 0 & 0 & 0 & 0 & 0 & 0 & 0 & 0 \\ 0 & 0 & 0 & 0 & 0 & 0 & 0 & 0 & -x_{41}^* & -x_{42}^* & -x_{43}^* & -x_{44}^* & x_{31}^* & x_{32}^* & x_{33}^* & x_{34}^* \end{bmatrix}$$
$\quad\quad\quad\quad\quad\quad\quad\quad\quad\quad\quad\quad\quad\quad\quad\quad\quad$ 601 603 605 607

FIG. 7

$$\begin{bmatrix} x_{11} & x_{12} & 0 & 0 & x_{12} & x_{22} & 0 & 0 & x_{13} & x_{23} & 0 & 0 & x_{14} & x_{24} & 0 & 0 \\ 0 & 0 & x_{31} & x_{41} & 0 & 0 & x_{32} & x_{42} & 0 & 0 & x_{33} & x_{43} & 0 & 0 & x_{34} & x_{44} \\ -x_{21}^* & x_{11}^* & 0 & 0 & -x_{22}^* & x_{12}^* & 0 & 0 & -x_{23}^* & x_{13}^* & 0 & 0 & -x_{24}^* & x_{14}^* & 0 & 0 \\ 0 & 0 & -x_{41}^* & x_{31}^* & 0 & 0 & -x_{41}^* & x_{32}^* & 0 & 0 & -x_{43}^* & -x_{33}^* & 0 & 0 & -x_{44}^* & x_{34}^* \end{bmatrix}$$

FIG. 11

TRANSMIT DIVERSITY METHOD FOR FQAM AND APPARATUS THEREOF

TECHNICAL FIELD

The present invention relates to a transmit diversity method for FQAM and an apparatus thereof.

BACKGROUND ART

In typical multi-cell wireless communication systems, a Gaussian assumption has been applied to an interference signal in order to perform decoding with lower complexity. Therefore, a conventional wireless communication system has used mainly a QAM-series modulation scheme to render a characteristic of an interference signal closer to a Gaussian distribution as much as possible.

However, since a non-Gaussian channel has a greater channel capacity than a Gaussian channel, the non-Gaussian channel may offer higher decoding performance than the Gaussian channel if a suitable decoding is performed. For this reason, the development of a modulation scheme that allows an interference signal to have a non-Gaussian characteristic has been needed, so that FQAM has been proposed as a modulation scheme.

Figure 1:
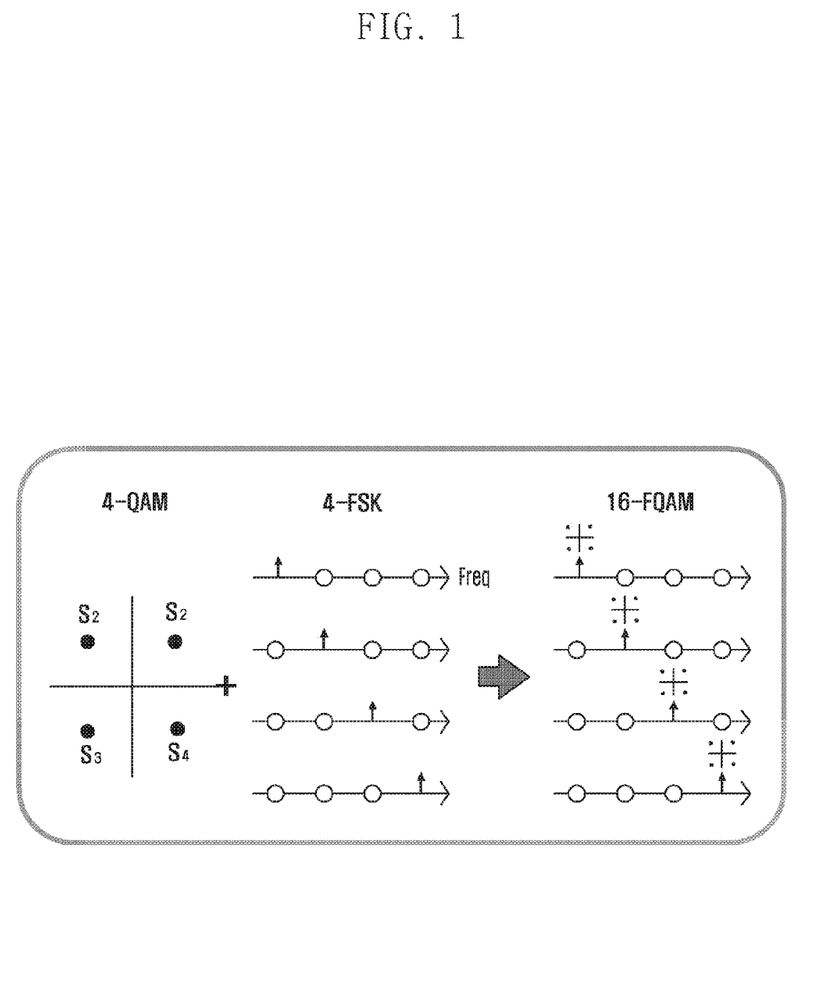
FIG. 1 is a diagram illustrating FQAM.

As shown in FIG. 1, FQAM is a hybrid modulation scheme for combining QAM with FSK, thus having both a higher spectral efficiency of QAM and a characteristic of FSK to form an interference signal in a non-Gaussian distribution.

Meanwhile, for more reliable communication using a plurality of antennas in a wireless communication system, transmit diversity techniques such as a space frequency block code (SFBC) and a space time block code (STBC) have been studied actively. However, since such transmit diversity techniques are induced on the assumption that a channel is unvaried within a frequency or time block, a serious degradation of performance is caused in case the channel is varied in such a block. Particularly, since a single symbol occupies a plurality of subcarriers (or OFDMA symbols) in the above-mentioned FQAM (or TQAM), simply applying the existing transmit diversity technique may invite a serious degradation of performance in a channel-varying environment. Accordingly, required for FQAM (or TQAM) is a transmit diversity technique that does not cause a serious degradation of performance even in a channel-varying environment.

DISCLOSURE OF INVENTION

Technical Problem

The object of the present invention is to provide, for FQAM (or TQAM), a transmit diversity technique that does not cause a serious degradation of performance even in a channel-varying environment.

Solution to Problem

In order to solve the above problem, a transmit diversity method of a transmitter for FQAM according to the present invention comprises steps of modulating data into at least one FQAM symbol, interleaving a plurality of tones constituting the at least one FQAM symbol such that tones having the same index are located in adjacent resources, and transmitting the at least one interleaved FQAM symbol through at least one transceiver unit.

Additionally, a transmit diversity method of a receiver for FQAM according to the present invention comprises steps of receiving at least one FQAM symbol through at least one transceiver unit, deinterleaving the at least one FQAM symbol in which a plurality of tones constituting the at least one FQAM symbol are interleaved such that tones having the same index are located in adjacent resources, and demodulating the at least one deinterleaved FQAM symbol.

Additionally, a transmitter performing a transmit diversity for FQAM according to the present invention comprises at least one transceiver unit, and a control unit configured to modulate data into at least one FQAM symbol, to interleave a plurality of tones constituting the at least one FQAM symbol such that tones having the same index are located in adjacent resources, and to transmit the at least one interleaved FQAM symbol through the at least one transceiver unit.

Additionally, A receiver performing a transmit diversity for FQAM according to the present invention comprises at least one transceiver unit configured to receive at least one FQAM symbol, and a control unit configured to deinterleave the at least one FQAM symbol in which a plurality of tones constituting the at least one FQAM symbol are interleaved such that tones having the same index are located in adjacent resources, and to demodulate the at least one deinterleaved FQAM symbol.

Advantageous Effects of Invention

A transmit diversity method for FQAM according to the present invention applies interleaving such that the same tones of FQAM symbols are located in adjacent resources, and thereby minimizes a degradation of performance due to a variation of a channel status even in FQAM having a greater frequency band of a subcarrier.

MODE FOR THE INVENTION

Hereinafter, embodiments of the present invention will be described with reference to the accompanying drawings. In this disclosure, well known functions or structures may not be described or illustrated in detail to avoid obscuring the subject matter of the present invention. Additionally, the terms used herein are defined in view of functions in this invention and may be varied according to user or operator's intention or custom. Therefore, such a definition should be made on the basis of the contents of this disclosure.

Additionally, in this disclosure, the present invention will be described using, as an example, FQAM and a space frequency block code (SFBC). However, this invention may be also applied to TQAM and a space time block code (STBC). Further, in this disclosure, although an Alamouti code will be described exemplarily as a representative transmit diversity method, any other transmit diversity method may be also applied.

Embodiments according to the present invention are described, based on a transmitter and a receiver. The transmitter and the receiver may be a base station and a mobile station. Alternatively, the transmitter and the receiver may be a terminal, a mobile, and the like.

Figure 2:
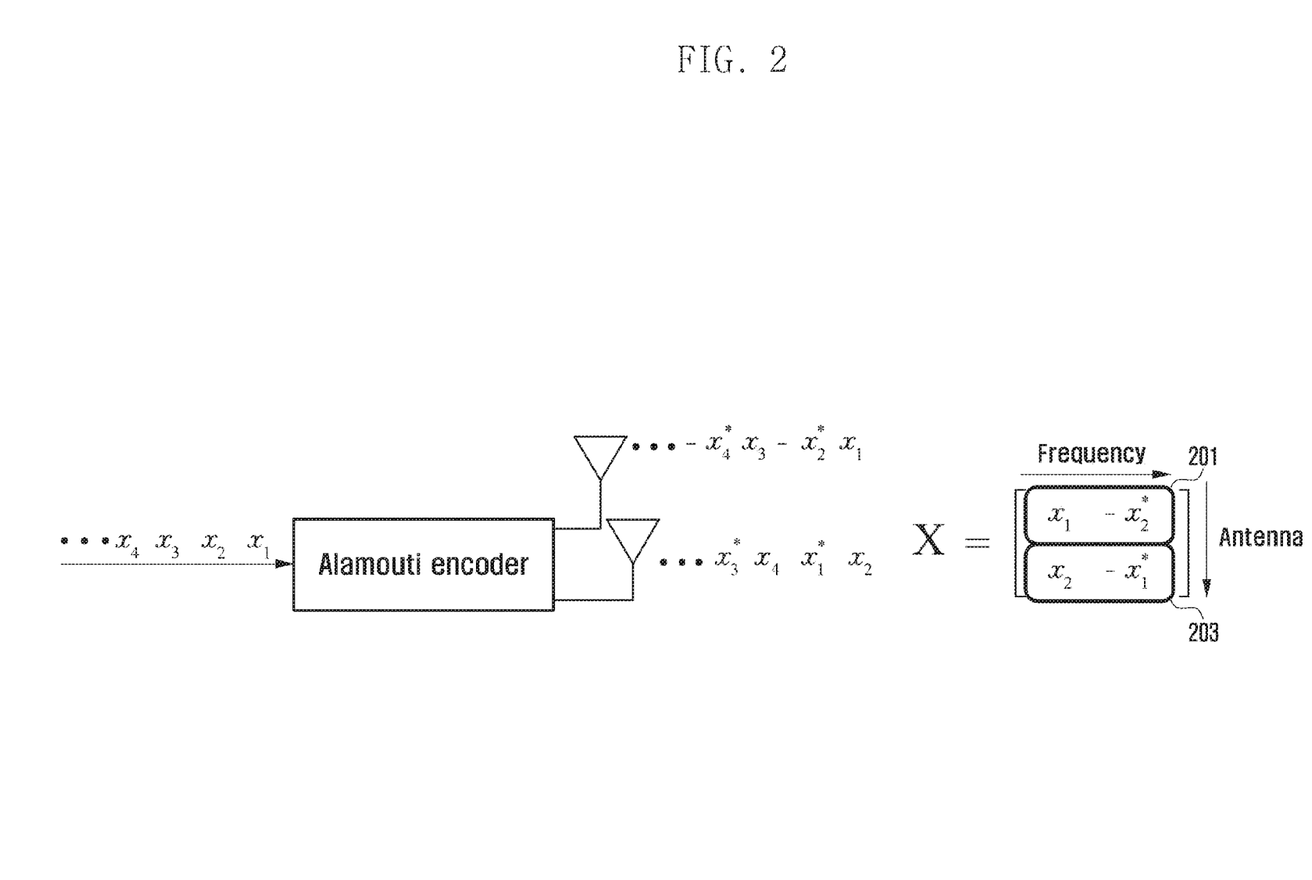
FIG. 2 is a diagram illustrating a space frequency block of a transmitting symbol in case a space frequency block code is used in the QAM modulation scheme.

FIG. 2 is a diagram illustrating a space frequency block of a transmitting symbol in case a space frequency block code is used in the QAM modulation scheme.

In case of using a space frequency block in a QAM modulation signal, a transmitting symbol transmitted at a transmitter is as shown in FIG. 2.

If a channel status is unvaried in respective frequency blocks 201 and 203, a receiver may decode a space frequency code as shown in Equation 1. In the QAM modulation scheme, the size (length) of the frequency blocks 201 and 203 (namely, the number of subcarriers) is equal to the number of transmitting antennas.

[Equation 1]

$$\text{Frequency} \downarrow \left\{ \begin{bmatrix} y_1 \\ y_2^* \end{bmatrix} = \begin{bmatrix} h_1 & h_2 \\ h_2^* & -h_1^* \end{bmatrix} \begin{bmatrix} x_1 \\ x_2 \end{bmatrix} + \begin{bmatrix} z_1 \\ z_2^* \end{bmatrix} \right\}$$

Multiplying $H^H$ $$\begin{bmatrix} \tilde{y}_1 \\ \tilde{y}_2 \end{bmatrix} = (|h_1|^2 + |h_2|^2) \begin{bmatrix} x_1 \\ x_2 \end{bmatrix} + \begin{bmatrix} \tilde{z}_1 \\ \tilde{z}_2 \end{bmatrix}$$

where $\begin{bmatrix} \tilde{y}_1 \\ \tilde{y}_2 \end{bmatrix} \triangleq \begin{bmatrix} h_1^* & h_2 \\ h_2^* & -h_1 \end{bmatrix} \begin{bmatrix} y_1 \\ y_2^* \end{bmatrix}$ and $\begin{bmatrix} \tilde{z}_1 \\ \tilde{z}_2 \end{bmatrix} \triangleq \begin{bmatrix} h_1^* & h_2 \\ h_2^* & -h_1 \end{bmatrix} \begin{bmatrix} z_1 \\ z_2^* \end{bmatrix}$ However, if a channel status is varied in the respective frequency blocks 201 and 203, a serious degradation of performance may be caused at the receiver.

Figure 3:
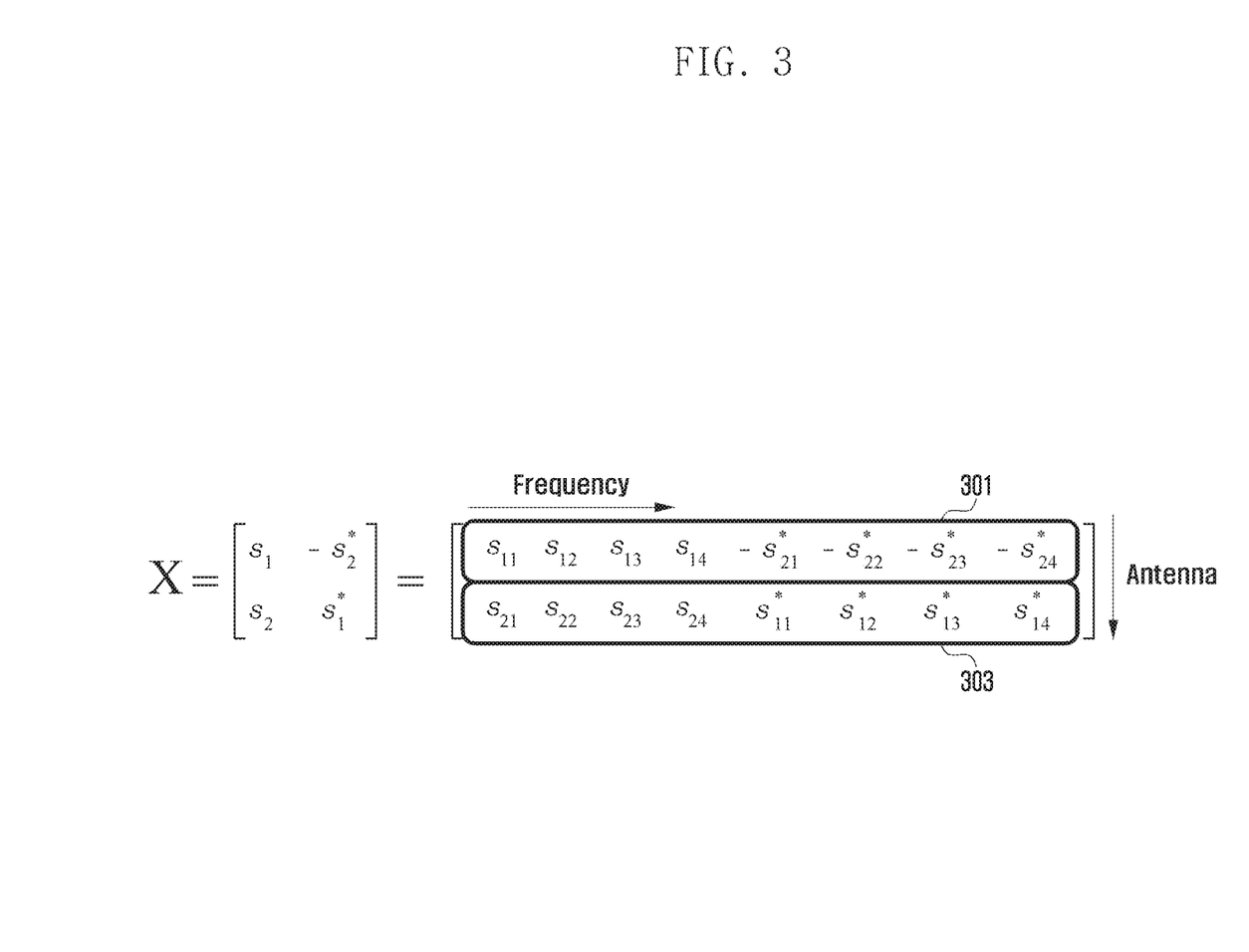
FIG. 3 is a diagram illustrating an example of a space frequency block of a transmitting symbol in case a space frequency block code is used in the FQAM modulation scheme.

FIG. 3 is a diagram illustrating an example of a space frequency block of a transmitting symbol in case a space frequency block code is used in the FQAM modulation scheme.

In case of using FQAM that has four tones in a single symbol, a space frequency block of a symbol transmitted at the transmitter having two antennas is as shown in FIG. 3. For example, in FIG. 3, S12 denotes the second tone of the first symbol.

Referring to FIG. 3, if the existing transmit diversity technique is used as it is in case of FQAM, the length of each frequency block 301 or 303 becomes longer in proportion to the number of tones than in case of QAM. This is expressed as "the number of transmitting antennas X the number of tones in a symbol". As a result, case of using FQAM has a broader bandwidth of subcarrier than case of using QAM. Namely, in case of using the same transmit diversity technique under the same channel status, FQAM undergoes a greater degradation of performance due to channel variations in comparison with QAM.

Assuming that a channel status is unvaried in the frequency blocks 301 and 303 in case of FQAM, a space frequency block received at the receiver is decoded as shown in Equation 2.

[Equation 1]

$$\begin{bmatrix} r_1 \\ r_2^* \end{bmatrix} = \begin{bmatrix} h_1 & h_2 \\ h_2^* & -h_2^* \end{bmatrix} \begin{bmatrix} s_1 \\ s_2 \end{bmatrix} + \begin{bmatrix} z_1 \\ z_2^* \end{bmatrix}$$

$$\begin{bmatrix} r_{11} \\ r_{21}^* \end{bmatrix} = \begin{bmatrix} h_{11} & h_{21} \\ h_{21}^* & -h_{11}^* \end{bmatrix} \begin{bmatrix} s_{11} \\ s_{21} \end{bmatrix} + \begin{bmatrix} z_{11} \\ z_{21}^* \end{bmatrix}$$

$$\begin{bmatrix} r_{12} \\ r_{22}^* \end{bmatrix} = \begin{bmatrix} h_{12} & h_{22} \\ h_{22}^* & -h_{12}^* \end{bmatrix} \begin{bmatrix} s_{12} \\ s_{22} \end{bmatrix} + \begin{bmatrix} z_{12} \\ z_{22}^* \end{bmatrix}$$

$$\begin{bmatrix} r_{13} \\ r_{23}^* \end{bmatrix} = \begin{bmatrix} h_{13} & h_{23} \\ h_{23}^* & -h_{13}^* \end{bmatrix} \begin{bmatrix} s_{13} \\ s_{23} \end{bmatrix} + \begin{bmatrix} z_{13} \\ z_{23}^* \end{bmatrix}$$

$$\begin{bmatrix} r_{14} \\ r_{24}^* \end{bmatrix} = \begin{bmatrix} h_{14} & h_{24} \\ h_{24}^* & -h_{14}^* \end{bmatrix} \begin{bmatrix} s_{14} \\ s_{24} \end{bmatrix} + \begin{bmatrix} z_{14} \\ z_{24}^* \end{bmatrix}$$

$$\begin{bmatrix} \tilde{r}_{11} \\ \tilde{r}_{21} \end{bmatrix} = (|h_{11}|^2 + |h_{21}|^2) \begin{bmatrix} s_{11} \\ s_{21} \end{bmatrix} + \begin{bmatrix} \tilde{z}_{11} \\ \tilde{z}_{21} \end{bmatrix}$$

Figure 4:
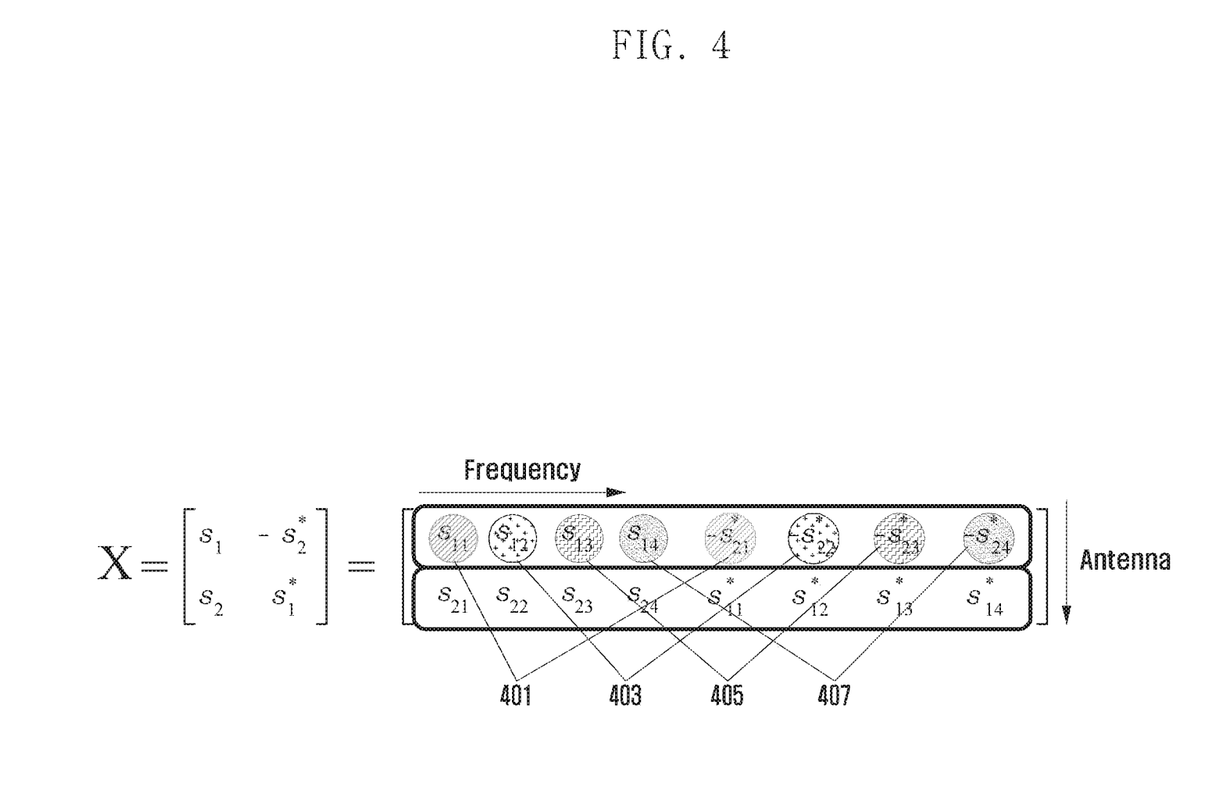
FIG. 4 is a diagram illustrating a space frequency block of a transmitting symbol in case a space frequency block code for two antennas is used in the FQAM modulation scheme.

Referring to Equation 2, a process of decoding a space frequency block of FQAM is performed independently for the same tone among a plurality of tones that constitute a plurality of FQAM symbols. As shown in FIG. 4, this means that no degradation of performance occurs in a decoding process if channel statuses of subcarriers corresponding to the same tones 401, 403, 405 and 407 of FQAM symbols in the frequency blocks 301 and 303 are equal to each other.

Figure 5:
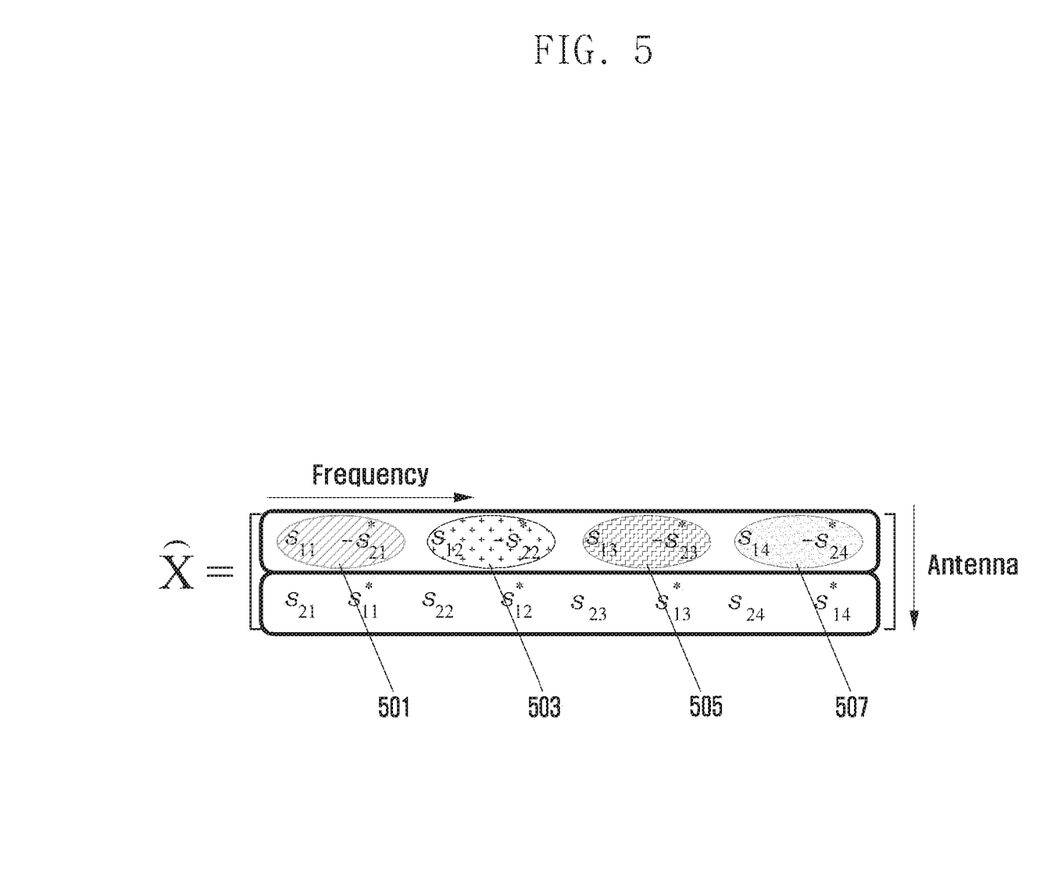
FIG. 5 is a diagram illustrating an example of applying interleaving according to the present invention in an embodiment of FIG. 4.

Using the above fact newly discovered in inducing a decoding process of an FQAM space frequency block, the present invention proposes a method of interleaving tones constituting FQAM symbols such that the same tones 501, 503, 505 and 507 of the FQAM symbols are located adjacently to each other in a space frequency block as shown in FIG. 5. An example of a detailed interleaving method is as shown in FIG. 5.

Referring to FIG. 5, with regard to a plurality of FQAM symbols for a plurality of antennas, this invention applies interleaving such that the same tones of FQAM symbols are located in adjacent resources (e.g., frequency, time). By allocating such interleaved tones to subcarriers, tones decoded together are transmitted through adjacent subcarriers having the same channel status. Therefore, even in FQAM having a greater frequency band of subcarrier, it is possible to minimize the degradation of performance due to a variation of a channel status.

In FIG. 5, a space frequency block is formed such that tones having the same position in the FQAM symbol are located as closely as possible. However, in a practical operation, such a space frequency block may be created and used flexibly or adaptively by using coherence bandwidth/Doppler spread of channel. Additionally, although the antennas have the same interleaving pattern in an example of FIG. 5, it is also apparent that such antennas may use different interleaving patterns.

Figure 6:
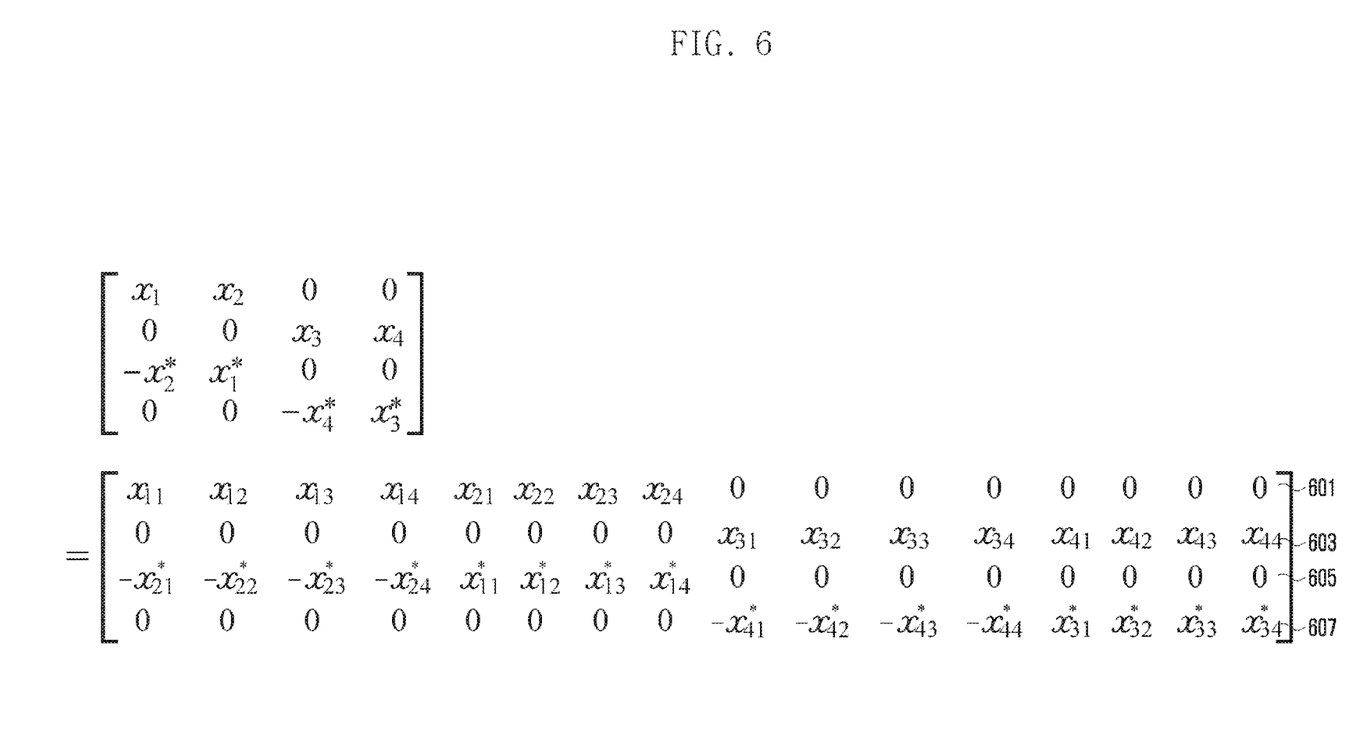
FIG. 6 is a diagram illustrating a space frequency block of a transmitting symbol in case a space frequency block code for four antennas is used in the FQAM modulation scheme.

FIG. 6 is a diagram illustrating a space frequency block of a transmitting symbol in case a space frequency block code for four antennas is used in the FQAM modulation scheme.

Referring to FIG. 6, in case of using FQAM that has four tones in a single symbol, a space frequency block of a symbol transmitted at the transmitter having four antennas is expressed as matrix having a 16*4 size as shown in FIG. 6. For example, in FIG. 6, S12 denotes the second tone of the first symbol.

Referring to FIG. 6, if the existing transmit diversity technique is used as it is in case of FQAM, the length of each frequency block 601, 603, 605 or 607 is "the number of transmitting antennas X the number of tones in a symbol" and becomes 16. As a result, a modulation scheme in an embodiment of FIG. 6 causes a greater bandwidth of subcarrier and thereby invites a greater degradation of performance due to channel variations.

Figure 7:
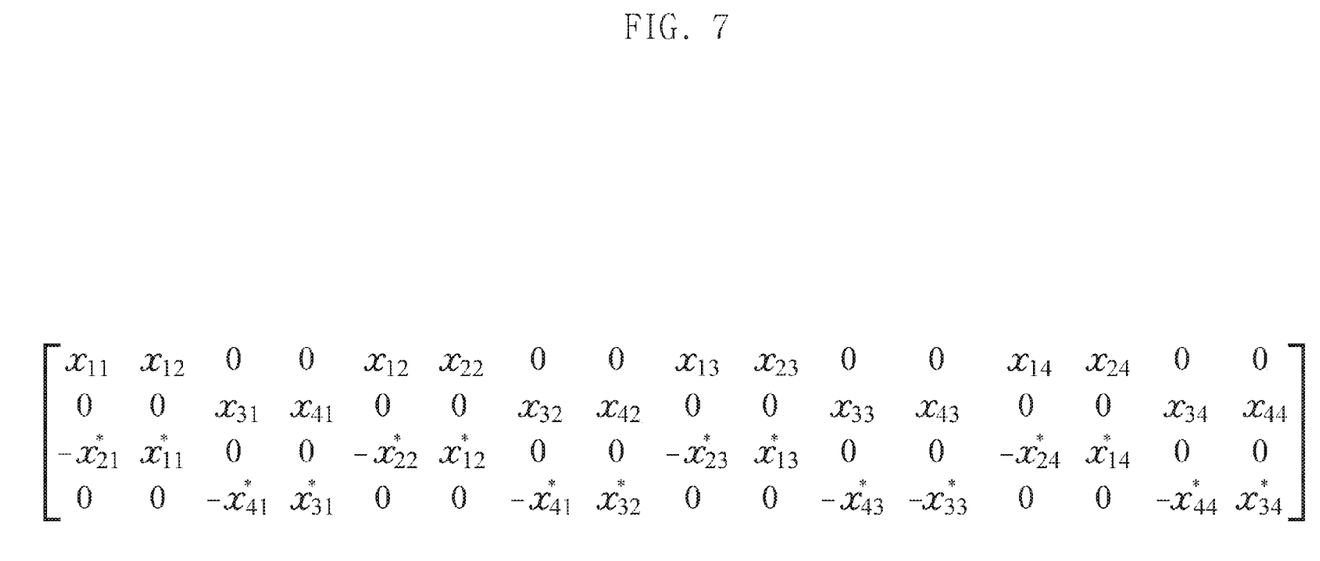
FIG. 7 is a diagram illustrating an example of applying interleaving according to the present invention in an embodiment of FIG. 6.

Applying the transmit diversity method according to this invention to the embodiment of FIG. 6 is as shown in FIG. 7. Referring to FIG. 7, in a space frequency block shown in FIG. 6, the transmit diversity method according to this invention interleaves tones constituting FQAM symbols such that the same tones of the FQAM symbols are located adjacently from each other. Namely, with regard to a plurality of FQAM symbols for a plurality of antennas, this invention applies interleaving such that the same tones of FQAM symbols are located in adjacent resources (e.g., frequency, time). At this time, in order to minimize interference between different tones, this invention may perform interleaving such that tone groups, disposed adjacently, are spaced apart from each other.

Figure 8:
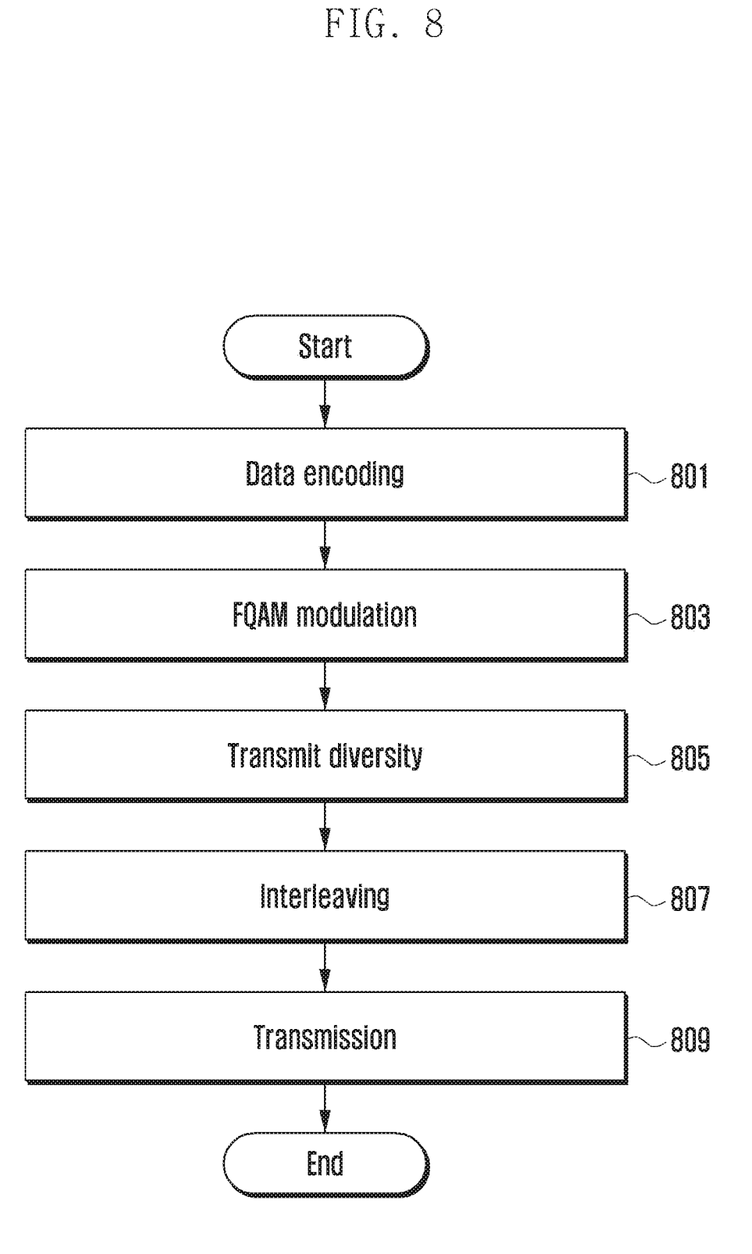
FIG. 8 is a flow diagram illustrating a transmit diversity method for FQAM of a transmitter according to the present invention.

FIG. 8 is a flow diagram illustrating a transmit diversity method for FQAM of a transmitter according to the present invention.

Referring to FIG. 8, at step 801, the transmitter encodes data into a plurality of FQAM symbols for a plurality of antennas. Namely, the transmitter forms a codeword by encoding, according to a predefined coding scheme, a certain data stream to be transmitted, and maps the codeword onto a symbol that represents a position on a signal constellation.

Thereafter, at step 803, the transmitter modulates the symbol according to the FQAM scheme. The FQAM modulation scheme is as discussed previously in FIG. 1.

At step 805, the transmitter performs a transmit diversity, based on the symbol modulated according to the FQAM modulation scheme. For example, using a transmit diversity technique such as a space frequency block code (SFBC) or a space time block code (STBC), the transmitter forms a space frequency block or a space time block on the basis of symbol. At this time, the transmitter may form the space frequency block or the space time block by using an Alamouti code.

The space frequency block (or the space time block) is matrix formed of rows corresponding to respective antennas of the transmitter and columns having tones, as elements, of FQAM symbols and also corresponding to respective subcarriers. In the space frequency block (or the space time block), each row may be referred to as a frequency block (or a time block). In the space frequency block (or the space time block), the length of row is proportional to the number of antennas and the number of tones constituting FQAM symbols. In the space frequency block (or the space time block), the length of column corresponds to the number of antennas.

In case the transmitter has two antennas and uses FQAM modulation of four tones, the transmitter may form a space frequency block having an 8*2 size as shown in FIG. 3. Additionally, in case the transmitter has four antennas and uses FQAM modulation of four tones, the transmitter may form a space frequency block having a 16*4 size as shown in FIG. 6.

Next, at step 807, the transmitter performs interleaving between tones.

According to an embodiment of this invention, the transmitter performs interleaving between tones such that tones having the same position (same index) among all tones constituting the modulated symbols are adjacent to each other. Namely, the transmitter performs interleaving such that tones corresponding to a certain position are located in adjacent resources (frequency or time). The space frequency block according to a result of interleaving is as discussed previously in FIGS. 5 and 7. At this time, the transmitter performs interleaving for each frequency block (namely, for each row) in the space frequency block. For this, the transmitter may have a plurality of tone interleavers each of which corresponds to the frequency block. The number of tone interleavers may correspond to the number of antennas.

This invention is not specially limited in a detailed algorithm for performing interleaving. For example, in various embodiments of this invention, in order to minimize interference between different tones, interleaving may be performed such that tone groups, disposed adjacently, are spaced apart from each other.

The transmitter may create and use flexibly or adaptively the space frequency block by using coherence bandwidth/Doppler spread of channel. In addition, the transmitter may apply the same interleaving pattern or different interleaving patterns to tones (i.e., respective frequency blocks) corresponding to respective antennas.

At step 809, the transmitter transmits the interleaved final FQAM symbols to the receiver through a plurality of antennas.

The transmitter may perform an inverse fast Fourier transform (IFFT) for the space frequency block having the final FQAM symbols to which interleaving is applied. In the space frequency block, the transmitter may transmit a signal through a plurality of antennas corresponding to respective frequency blocks.

Figure 9:
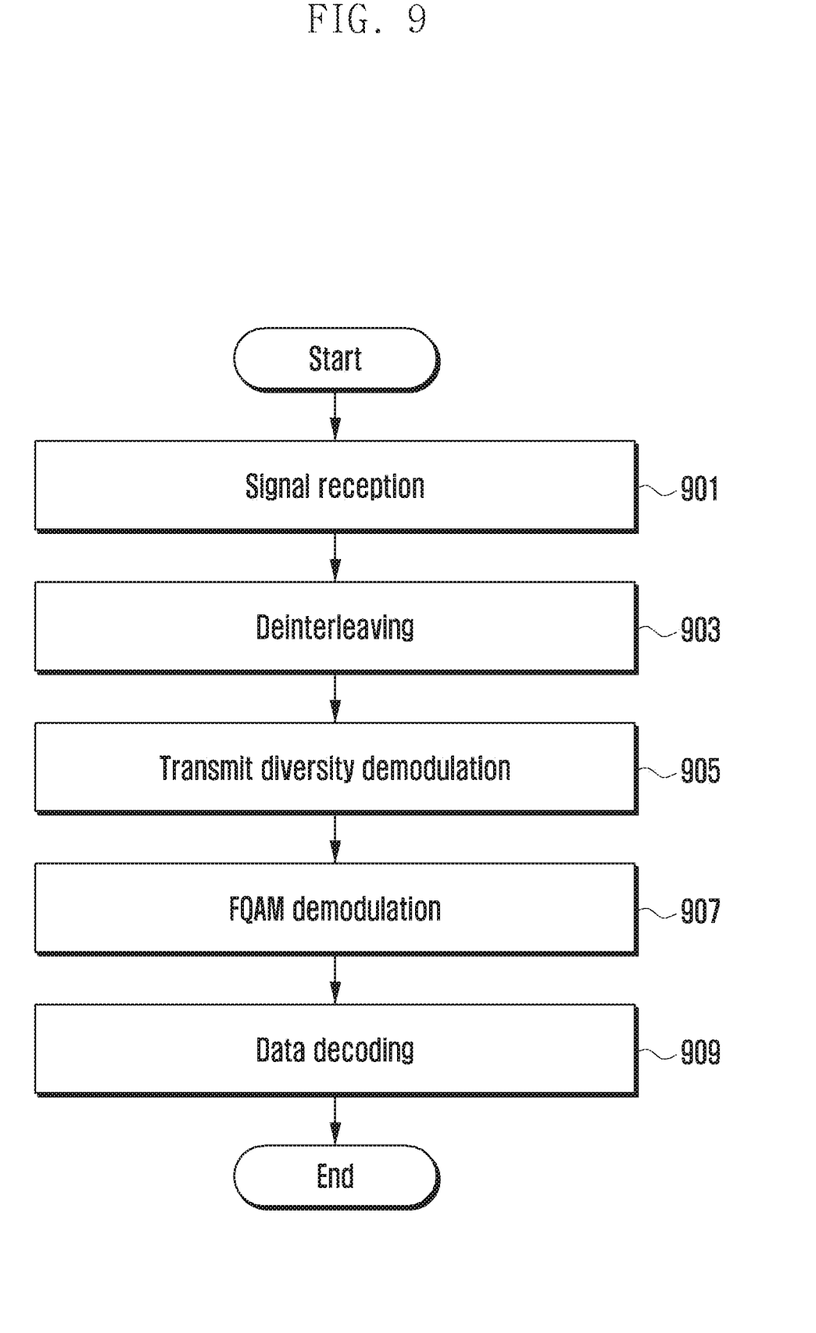
FIG. 9 is a flow diagram illustrating a transmit diversity method for FQAM of a receiver according to the present invention.

FIG. 9 is a flow diagram illustrating a transmit diversity method for FQAM of a receiver according to the present invention.

Referring to FIG. 9, at step 901, the receiver receives a signal from the transmitter. The receiver receives such signals through a plurality of antennas equipped therein. The signals received through respective antennas may form frequency blocks, which may be arranged in the order of row and thereby form a space frequency block. At this time, the length of the frequency block (the number of rows of the space frequency block) may be proportional to the number of tones constituting FQAM symbols of the received signals and the number of antennas of the receiver. Also, the number of rows of the space frequency block may be proportional to the number of the received signals, namely, the number of antennas of the receiver.

Thereafter, at step 903, the receiver performs deinterleaving for the received signals. The receiver performs a fast Fourier transform (FFT) for the received signals and, based on the formed space frequency block, performs deinterleaving. At this time, the receiver performs deinterleaving for each frequency block (i.e., for each row) in the space frequency block. For this, the receiver may have a plurality of tone deinterleavers each of which corresponds to the frequency block. The number of tone deinterleavers may correspond to the number of antennas.

The signals received by the receiver may be signals for which interleaving between tones has been performed such that tones having the same position (same index) among all tones constituting the modulated FQAM symbols are adjacent to each other. Therefore, the receiver may form a space frequency block having an original array of FQAM symbols by performing inversely interleaving performed at the transmitter.

The receiver may perform deinterleaving by performing inversely an algorithm of interleaving performed at the transmitter. A detailed algorithm for performing deinterleaving is not specially limited, and the receiver may perform an algorithm for deinterleaving, based on information about an interleaving algorithm performed at the transmitter. The transmitter and the receiver may share information about interleaving and deinterleaving algorithms through upper signaling or on the basis of information earlier stored by a device manufacturer.

Next, at step 905, the receiver performs a transmit diversity demodulation, based on the deinterleaved space frequency block. For example, using a transmit diversity technique such as a space frequency block code (SFBC) or a space time block code (STBC), the receiver creates an FQAM symbol based on a space frequency block. At this time, the receiver may create the FQAM symbol by using an Alamouti code. Thereafter, at step 907, the receiver demodulates the created FQAM symbol according to the FQAM scheme. Then, at step 911, the receiver decodes a codeword created by demodulation and thereby restores an original data stream.

Figure 10:
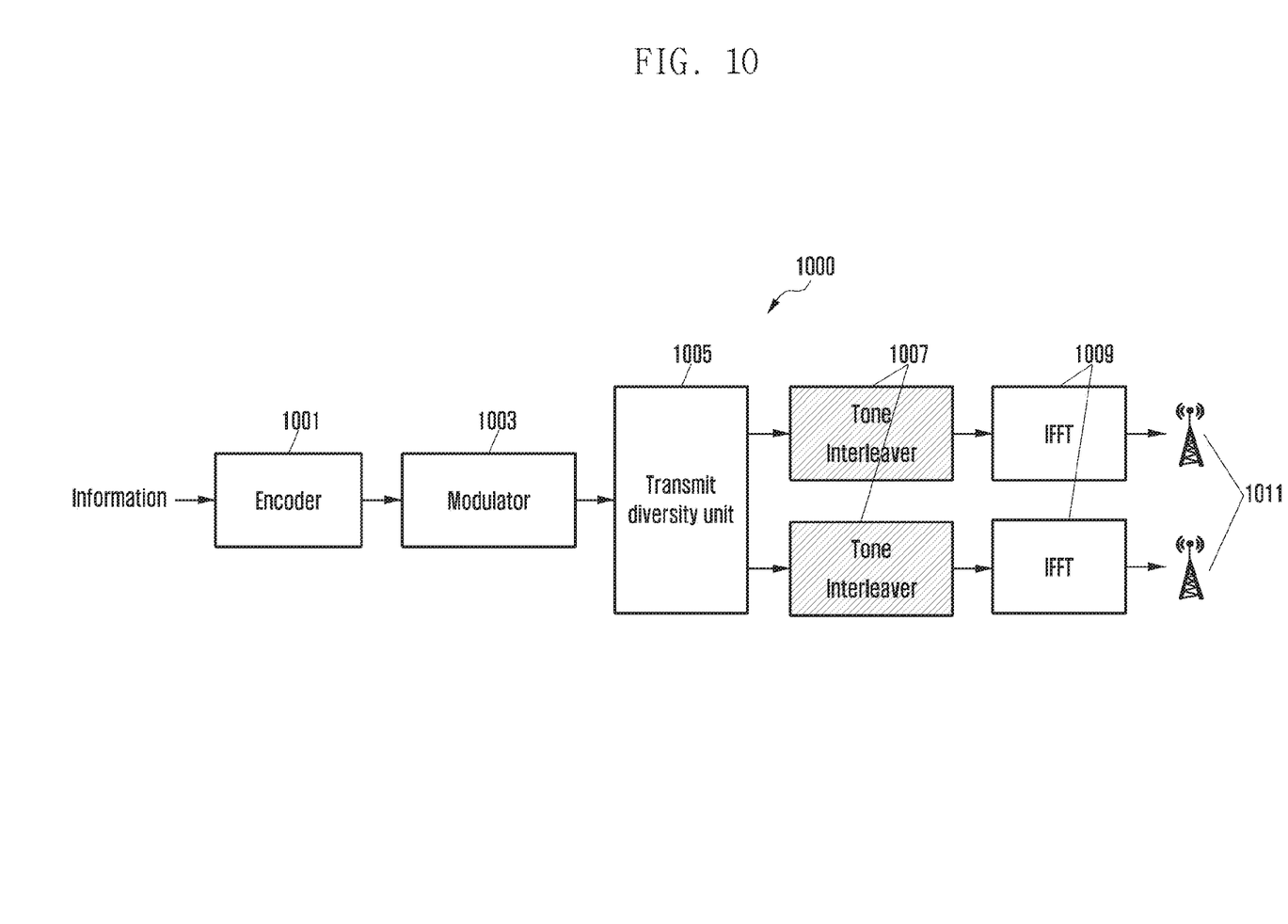
FIG. 10 is a block diagram illustrating the structure of a transmitter according to the present invention.

FIG. 10 is a block diagram illustrating the structure of a transmitter according to the present invention.

Referring to FIG. 10, the transmitter 1000 includes an encoder 1001, a modulator 1003, a transmit diversity unit 1005, a tone interleaver 1007, an IFFT 1009, and a transceiver unit 1011.

The encoder 1001 forms a codeword by encoding, according to a predefined coding scheme, a certain data stream to be transmitted, and maps the codeword onto a symbol that represents a position on a signal constellation.

The modulator 1003 modulates, according to the FQAM scheme, the symbol created by the encoder 1001.

The transmit diversity unit 1005 performs a transmit diversity, based on the symbol modulated according to the FQAM modulation scheme. For example, using a transmit diversity technique such as a space frequency block code (SFBC) or a space time block code (STBC), the transmit diversity unit 1005 forms a space frequency block or a space time block on the basis of symbol. At this time, the transmit diversity unit 1005 may form the space frequency block or the space time block by using an Alamouti code.

The space frequency block (or the space time block) is matrix formed of rows corresponding to respective antennas of the transmitter and columns having tones, as elements, of FQAM symbols and also corresponding to respective sub-carriers. In the space frequency block (or the space time block), each row may be referred to as a frequency block (or a time block). In the space frequency block (or the space time block), the length of row is proportional to the number of antennas and the number of tones constituting FQAM symbols. In the space frequency block (or the space time block), the length of column corresponds to the number of antennas.

In case the transmitter 1000 has two transceiver units 1011 and uses FQAM modulation of four tones, the transmit diversity unit 1005 may form a space frequency block having an 8*2 size as shown in FIG. 3. Additionally, in case the transmitter 1000 has four transceiver units 1011 and uses FQAM modulation of four tones, the transmit diversity unit 1005 may form a space frequency block having a 16*4 size as shown in FIG. 6.

The transmit diversity unit 1005 may be referred to as a space frequency block creation unit (or a space time block creation unit).

The tone interleaver 1007 performs interleaving between tones such that tones having the same position (same index) among all tones constituting the modulated symbols are adjacent to each other. Namely, the tone interleaver 1007 performs interleaving such that tones corresponding to a certain position are located in adjacent resources (frequency or time). At this time, the tone interleaver 1007 performs interleaving for each frequency block (namely, for each row) in the space frequency block. For this, the transmitter may have a plurality of the tone interleavers 1007 each of which corresponds to the frequency block. The number of the tone interleavers 1007 may correspond to the number of the transceiver units 1011.

This invention is not specially limited in a detailed algorithm for performing interleaving. For example, in various embodiments of this invention, in order to minimize interference between different tones, interleaving may be performed such that tone groups, disposed adjacently, are spaced apart from each other.

The tone interleaver 1007 may create and use flexibly or adaptively the space frequency block by using coherence bandwidth/Doppler spread of channel. In addition, the transmitter may apply the same interleaving pattern or different interleaving patterns to tones (i.e., respective frequency blocks) corresponding to respective antennas.

The IFFT 1009 may perform an inverse fast Fourier transform (IFFT) for the space frequency block having the final FQAM symbols to which interleaving is applied.

The encoder 1001, the modulator 1103, the transmit diversity unit 1005, the tone interleaver 1007 and the IFFT 1009 may be referred to as a single element, i.e., a control unit.

The transceiver unit 1011 transmits the final signal created through the above-discussed process to the receiver. According to this invention, a plurality of the transceiver units 1011 may be used.

Figure 11:
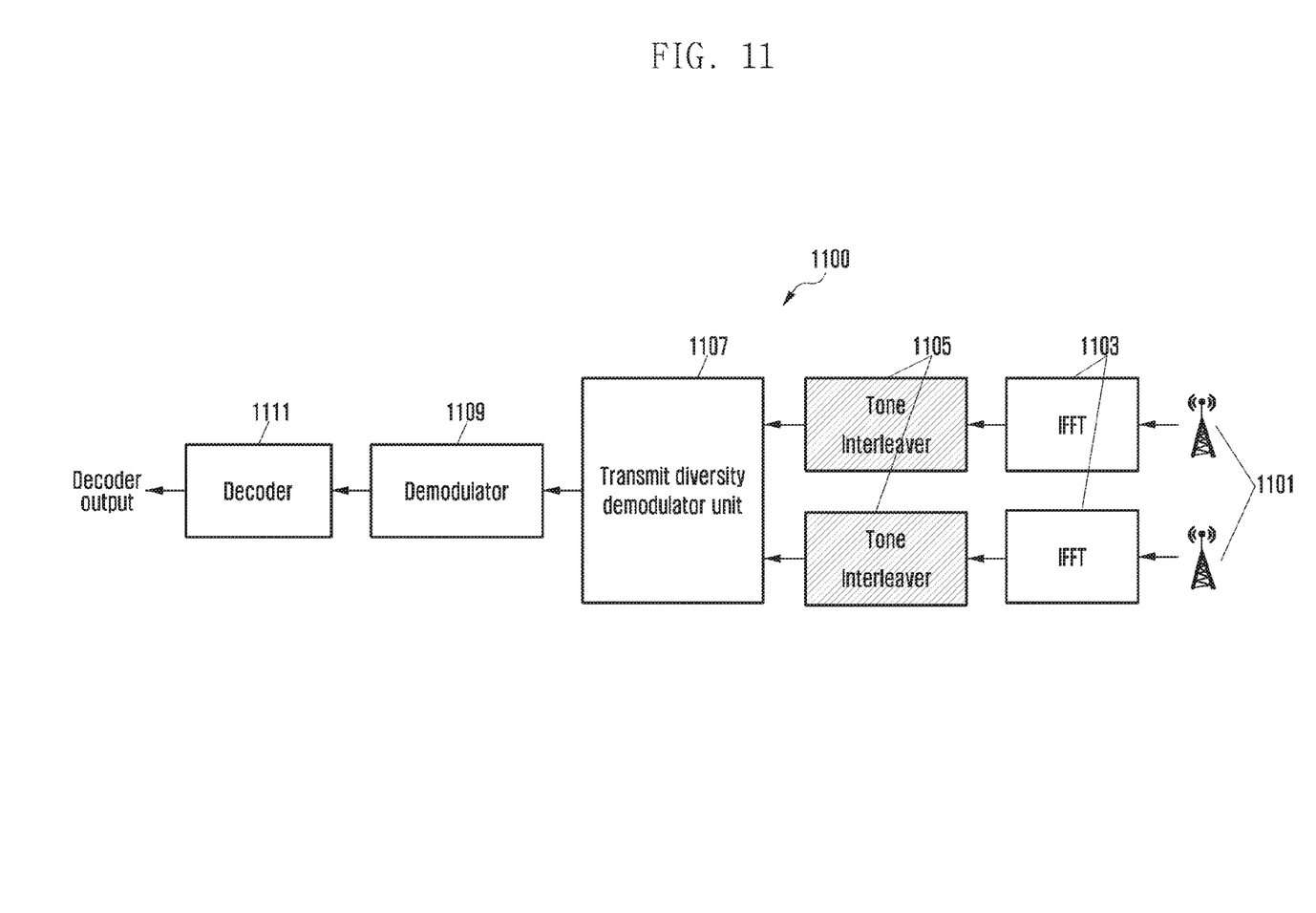
FIG. 11 is a block diagram illustrating the structure of a receiver according to the present invention.

FIG. 11 is a block diagram illustrating the structure of a receiver according to the present invention.

Referring to FIG. 11, the receiver 1100 includes a transceiver unit 1101, an FFT 1103, a tone deinterleaver 1105, a transmit diversity demodulator unit 1107, a demodulator 1109, and a decoder 1111.

The transceiver unit 1101 receives at least one signal. According to this invention, a plurality of the transceiver units 1101 may be used. The signals received through the transceiver units 1101 may form frequency blocks, which may be arranged in the order of row and thereby form a space frequency block. At this time, the length of the frequency block (the number of rows of the space frequency block) may be proportional to the number of tones constituting FQAM symbols of the received signals and the number of the transceiver units 1101. Also, the number of rows of the space frequency block may be proportional to the number of the received signals, namely, the number of the transceiver units 1101.

The FFT 1103 performs a fast Fourier transform (FFT) for the received signals.

The tone deinterleaver 1105 performs deinterleaving, based on the formed space frequency block. At this time, the tone deinterleaver 1105 performs deinterleaving for each frequency block (i.e., for each row) in the space frequency block. For this, the receiver 1100 may have a plurality of the tone deinterleavers 1105 each of which corresponds to the frequency block. The number of the tone deinterleavers 1105 may correspond to the number of the transceiver units 1101.

The received signals may be signals for which interleaving between tones has been performed such that tones having the same position (same index) among all tones constituting the modulated FQAM symbols are adjacent to each other. Therefore, the tone deinterleaver 1105 may form a space frequency block having an original array of FQAM symbols by performing inversely interleaving performed at the transmitter.

The tone deinterleaver 1105 may perform deinterleaving by performing inversely an algorithm of interleaving performed at the transmitter. A detailed algorithm for performing deinterleaving is not specially limited, and the tone deinterleaver 1105 may perform an algorithm for deinterleaving, based on information about an interleaving algorithm performed at the transmitter. The transmitter and the receiver may share information about interleaving and deinterleaving algorithms through upper signaling or on the basis of information earlier stored by a device manufacturer.

The transmit diversity modulator unit 1107 performs a transmit diversity demodulation, based on the deinterleaved space frequency block. For example, using a transmit diversity technique such as a space frequency block code (SFBC) or a space time block code (STBC), the transmit diversity modulator unit 1107 creates an FQAM symbol based on a space frequency block. At this time, the transmit diversity modulator unit 1107 may create the FQAM symbol by using an Alamouti code.

The demodulator 1109 demodulates the created FQAM symbol according to the FQAM scheme.

The decoder 1111 decodes a codeword created by demodulation and thereby restores an original data stream.

The FFT 1103, the tone deinterleaver 1105, the transmit diversity demodulator unit 1107, the demodulator 1109, and the decoder 1111 may be referred to as a single element, i.e., a control unit.

The principles and features of the present invention may be employed in varied and numerous embodiments without departing from the scope of the invention. Accordingly, it should be apparent to those skilled in the art that this description is provided for illustration purpose only and not for the purpose of limiting the present invention as defined by the appended claims and their equivalents.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. While this invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method of a frequency and quadrature amplitude modulation (FQAM) transmitter, the method comprising:
   modulating data into at least one FQAM symbol;
   interleaving a plurality of tones constituting the at least one FQAM symbol such that tones having the same index are located in adjacent resources; and
   transmitting the at least one interleaved FQAM symbol through at least one transceiver.

2. The method of claim 1, wherein the interleaving of the plurality of tones comprises:
   classifying the at least one FQAM symbol into a plurality of groups; and
   for each of the plurality of groups, interleaving the plurality of tones constituting the at least one FQAM symbol contained in each of the plurality of groups.

3. The method of claim 2, wherein the transmitting of the at least one interleaved FQAM symbol comprises transmitting the at least one interleaved FQAM symbol contained in the plurality of groups through a transceiver corresponding to each of the plurality of groups.

4. The method of claim 1, wherein the interleaving of the plurality of tones comprises:
   forming a space frequency block (SFB) or a space time block (STB), based on the plurality of tones constituting the at least one FQAM symbol; and
   interleaving such that tones having the same index are located in adjacent resources, in a unit of frequency block or time block in the SFB or the STB,
   wherein the SFB or the STB comprises a matrix formed of a row and a column, the row having a length being proportional to a number of the transceivers and a number of tones constituting the single FQAM symbol, and the column having a length corresponding to the at least one transceiver,
   wherein the frequency block or the time block corresponds to the row, and
   wherein the resource is one of a time resource or a frequency resource.

5. A transmitter for performing a transmit diversity for frequency and quadrature amplitude modulation (FQAM), the transmitter comprising:
   at least one transceiver; and
   a processor configured to:
     modulate data into at least one FQAM symbol,
     interleave a plurality of tones constituting the at least one FQAM symbol such that tones having the same index are located in adjacent resources, and
     transmit the at least one interleaved FQAM symbol through the at least one transceiver.

6. The transmitter of claim 5, wherein the processor is further configured to:
   classify the at least one FQAM symbol into a plurality of groups, and
   for each of the plurality of groups, interleave the plurality of tones constituting the at least one FQAM symbol contained in each of the plurality of groups.

7. The transmitter of claim 6, wherein the processor is further configured to transmit the at least one interleaved FQAM symbol contained in the plurality of groups through a transceiver corresponding to each of the plurality of groups.

8. The transmitter of claim 5, wherein the processor is further configured to:
   form a space frequency block (SFB) or a space time block (STB), based on the plurality of tones constituting the at least one FQAM symbol, and interleave such that tones having the same index are located in adjacent resources, in a unit of frequency block or time block in the SFB or the STB, wherein the SFB or the STB comprises a matrix formed of a row and a column, the row having a length being proportional to a number of transceivers and a number of tones constituting the single FQAM symbol, and the column having a length corresponding to the at least one transceiver, wherein the frequency block or the time block corresponds to the row, and wherein the resource is one of a time resource or a frequency resource.

* * * * *